United States Patent [19]

Walter

[11] 4,307,622
[45] Dec. 29, 1981

[54] RACK STEERING MECHANISM

[75] Inventor: Wolfgang Walter, Schwabisch Gmund, Fed. Rep. of Germany

[73] Assignee: Zahnradfabrik Friedrichshafen AG, Friedrichshafen, Fed. Rep. of Germany

[21] Appl. No.: 89,481

[22] Filed: Oct. 30, 1979

[30] Foreign Application Priority Data

Nov. 10, 1978 [DE] Fed. Rep. of Germany ....... 2848842

[51] Int. Cl.³ .......................... F16H 1/04; F16D 1/10
[52] U.S. Cl. ........................................ 74/422; 403/375
[58] Field of Search ............. 74/422, 89.17; 285/321, 285/384, 353, 356, 357, 388; 403/375

[56] References Cited

U.S. PATENT DOCUMENTS

| 2,469,851 | 5/1949 | Stecher et al. | 285/356 |
| 2,470,546 | 5/1949 | Carlson | 285/356 X |
| 2,499,024 | 2/1950 | Hollyday, Jr. | 285/356 X |
| 3,593,593 | 7/1971 | Bradshaw | 74/422 X |
| 3,871,691 | 3/1975 | Takagi | 285/321 |

FOREIGN PATENT DOCUMENTS

| 1817319 | 7/1970 | Fed. Rep. of Germany | 285/356 |
| 2406566 | 8/1975 | Fed. Rep. of Germany | . |
| 2809781 | 9/1978 | Fed. Rep. of Germany | . |
| 827241 | 2/1960 | United Kingdom | 285/321 |

Primary Examiner—C. J. Husar
Assistant Examiner—Conrad Berman
Attorney, Agent, or Firm—Zalkind & Shuster

[57] ABSTRACT

The invention provides a lightweight, economical rack steering mechanism comprising a booster pressure cylinder having a piston mounted on a toothed rack engaged by a pinion carried by an end closure element secured to the cylinder which has an end closure element at its opposite end. The rack extends in each direction out of the closure ends which effect housings for respective cylinder ends. The rack ends have connection to steering linkage means. The particularly novel feature is the use of lightweight metal, e.g., aluminum tubing, for the pressure cylinder. The mode of securing is by means of a corrugation adjacent each end of the cylinder which effects means in conjunction with locking or securing nuts and clamping or locking rings for fastening the housing ends to the cylinder. The aluminum tubing is protected against abrasive and twisting effect of nut tightening by arranging the securing nuts to abut the clamping rings which abut respective tubing corrugations nonrotatively. The securing nuts are rotatively tightened to grip the tubing through the clamping rings, being carried threadedly in respective end elements.

3 Claims, 3 Drawing Figures

RACK STEERING MECHANISM

This application is related to my Application, Ser. No. 99,807, filed Dec. 3, 1979 and having the same assignee.

Rack steering cylinders of the general type described are used for passenger cars, racing cars, sports cars and light trucks. They have the advantage of strong return movement, direct gear drive ratio, compact construction and few connecting elements to the steered wheels. This is especially advantageous for rear engine vehicle installation.

In general, rack steering mechanisms comprise a composite housing, one end of which is a steering box which carries a pinion to reciprocate the rack and is operable by a steering wheel via suitable shafting. The other end of the housing serves as a closure for the pressure cylinder, which is sealingly secured between the two housing ends. The rack carries a foreshortened piston slidable within the cylinder which provides booster steering when either end of the cylinder is pressurized to drive the rack.

In prior art constructions, the cylinder is of steel and requires the machining of end grooves into the metal in order to provide means in conjunction with retaining rings loosely carried in the grooves and locking nuts for fastening the cylinder to the housing ends.

Such constructions are expensive as to the machining processes and the final assembly is heavy beyond need. The present invention eliminates expensive machine work and reduces overall weight of the assembly by the expedient of using light metal tubing for the cylinder wherein a corrugation can be effected at each end by a quick and simple operation using any known kind of cold forming. Thus, if machine grooving were to be used, the material would have to be considerably thicker, especially to guard against tensile weakening of the cylinder at the grooves since the high booster pressure could produce failure in operation.

However, by the use of the present invention, a relatively light metal tube can be used for the cylinder and cold forming the corrugations produces no weakness.

Aluminum, for the light metal tubing, is believed particularly suitable since it can be used as thin wall tubing, easily formed with corrugations, and resulting in cost saving and weight reduction, wherein other ductile metals may be used, preferably as thin wall tubing commensurate with the tensile stress to be met.

A detailed description of the invention now follows in conjunction with the appended drawing in which.

Figure 1:
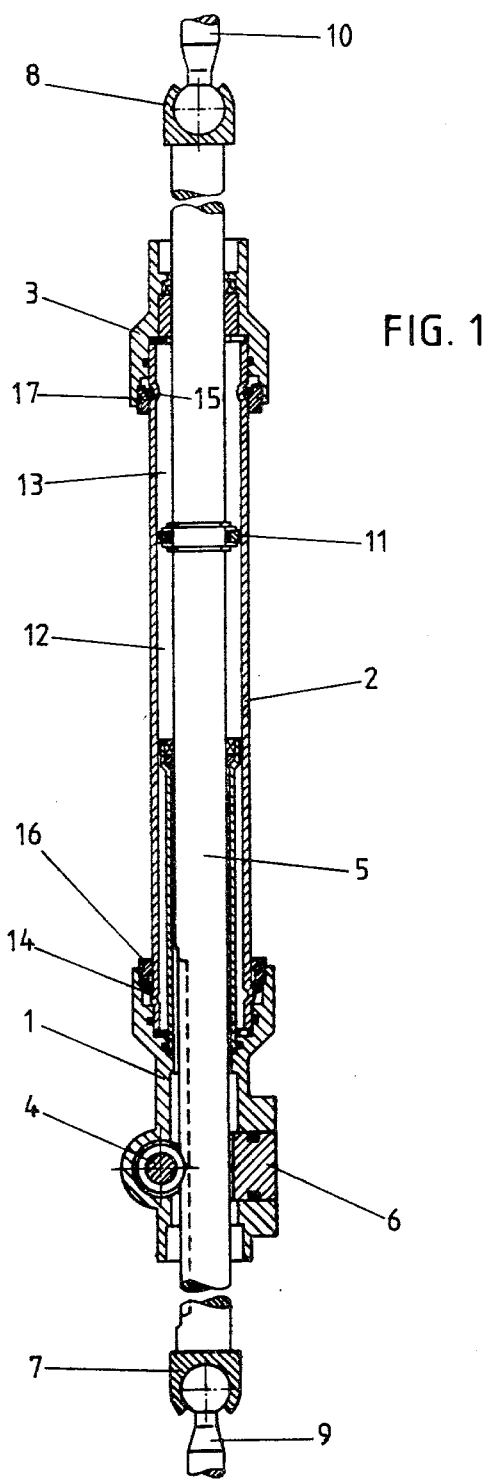
FIG. 1 is a longitudinal section through a rack and cylinder.

Referring to FIG. 1, the invention comprises the pinion end housing 1 which may be termed a steering box and which carries a pinion 4 understood to be rotatable by a manually operated steering wheel, all in conventional fashion. A thin wall light metal cylinder 2 extends from housing 1 to an end housing 3. The end housings guidingly and slidably support a rack 5 for reciprocation. The pinion 4 and rack 5 are in teeth-meshing relationship in the usual manner and a radical support guide 6 of conventional construction is in the housing end 1.

At its ends, which protrude outwardly of the housing ends, the rack is provided with ball joints 7 and 8 for articulation with steering linkage elements 9 and 10, respectively.

A foreshortened piston 11 is secured on rack 5 and operates between pressure chambers 12 and 13 in cylinder 2 in the usual manner under valving control, all as well known in the prior art.

Figure 2:
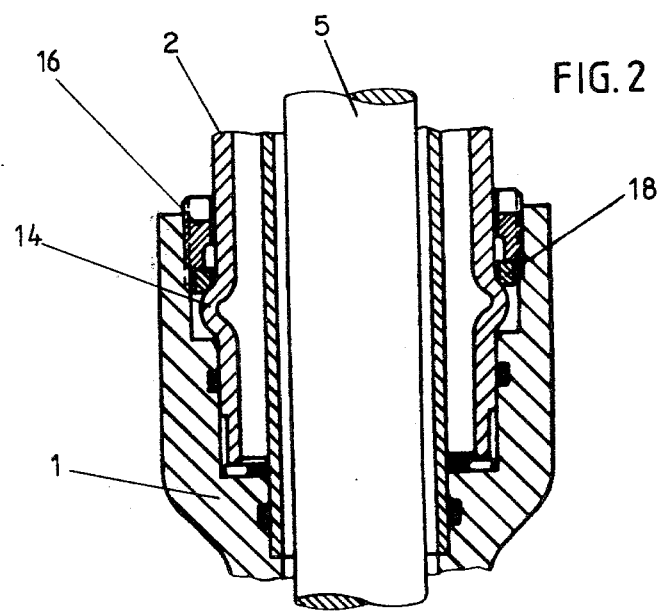
FIG. 2 is an enlarged longitudinal section of the pinion end housing for the cylinder.

Referring to FIG. 2, the housing end 1 encompasses the respective end of cylinder 2 and such cylinder is provided with an outwardly and radially extending protuberance means, such as an annular corrugation 14 as shown. This is readily produced in light metal cylinders without machining but by suitable pressing or other type of cold forming and effects a ridge to take the axial thrust of a locking nut 16 against a clamping ring 18 which abuts the corrugation. The locking nut 16 is threadedly carried in housing end 1. It will be apparent that rotation of nut 16, generally a castellated nut as shown, will have frictional rotative engagement only with ring 18 and not with any surface of tube 2. Ring 18 therefore remains rotatively stationary so as not to abrade the surface of the corrugation against which it abuts or otherwise cause damage when this end of cylinder 2 is secured to housing end 1 by tightening of the nut.

Figure 3:
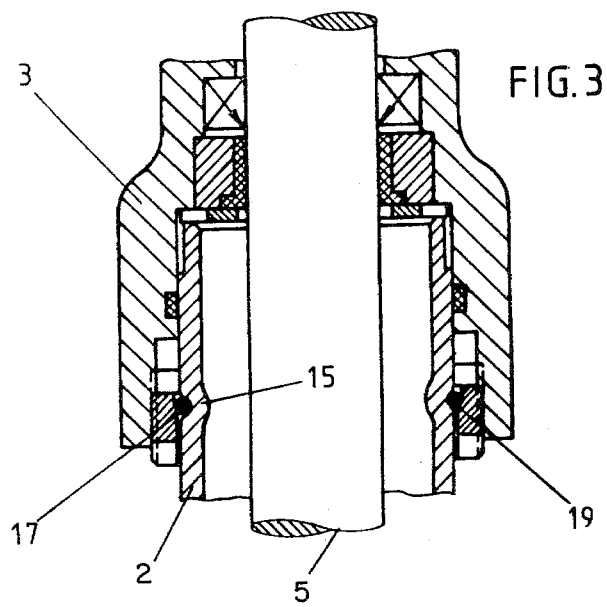
FIG. 3 is an enlarged longitudinal section of the other end housing for the cylinder.

Referring to FIG. 3, the securing arrangement is similar except that the annular corrugation 15 is formed radially inwardly and in such instance the locking nut 17 abuts a clamping ring 19 carried in the corrugated indentation cylinder 2. Thus, abrasive damage due to rotation of the nut is avoided since the ring 19 is nonrotative. Accordingly, housing end 3 is thus secured to cylinder 2.

It will be recognized that the cylinder could be made with outwardly extending corrugations at both ends instead of an inner and outer corrugation, but this would effect an enlarged diameter which in turn would require correspondingly larger clamping rings and locking nuts.

Various changes may be made without departing from the spirit of the invention as herein disclosed, as will be recognized, and the invention is not limited to the exact disclosure except as to the extent set forth in the appended claims.

What is claimed is:

1. In a rack steering mechanism wherein a pressure cylinder has ends secured to respective housing end members, the improvement comprising a cylinder of a lightweight ductile metal with cold formed protruberance means adjacent each end within a respective housing end member and respective securing means for securing each end of said cylinder in a respective end member; said securing means being intermediate the respective housing end member and a respective protuberance means and axially movable so as to effect clamping stress between the respective housing end member and the respective protuberance means;

wherein the securing means comprises a ring engaging each protuberance means and a rotative nut threadedly carried in the respective housing end for effecting axial stress against a respective ring to clamp each end of the cylinder to a respective housing end;

and wherein said protuberance means are corrugations;

and wherein a corrugation at one end of said cylinder is directed radially inwardly and at the other end is directed radially outwardly;

and wherein the housing end member secured to said cylinder by means of the radially outwardly directed corrugation and respective securing means carries a steering pinion, and a piston in said cylinder having a rack engaged with said steering pinion.

2. In a rack steering mechanism as set forth in claim 1, wherein one said ring engages the radially outwardly directed corrugation and the other said ring is disposed in the radially inwardly directed corrugation and protruding peripherally therefrom to be engaged by a respective rotative nut.

3. In a rack steering mechanism as set forth in claim 2, wherein said cylinder is made of aluminum.

* * * * *